(12) United States Patent
Levy

(10) Patent No.: US 11,299,258 B2
(45) Date of Patent: Apr. 12, 2022

(54) SYSTEM FOR AUTOMATIC ADJUSTMENT OF THE C.G (CENTER OF GRAVITY) POINT IN A POWERED PARACHUTE AND FLEXIBLE WING AERIAL VEHICLE

(71) Applicant: Moshe Levy, Jerusalem (IL)

(72) Inventor: Moshe Levy, Jerusalem (IL)

(*) Notice: Subject to any disclaimer, the term of this patent is extended or adjusted under 35 U.S.C. 154(b) by 0 days.

(21) Appl. No.: 16/964,504

(22) PCT Filed: Aug. 20, 2019

(86) PCT No.: PCT/IL2019/050933
§ 371 (c)(1),
(2) Date: Jul. 23, 2020

(87) PCT Pub. No.: WO2020/039435
PCT Pub. Date: Feb. 27, 2020

(65) Prior Publication Data
US 2021/0380227 A1  Dec. 9, 2021

(30) Foreign Application Priority Data

May 24, 2018  (IL) .......................................... 261364

(51) Int. Cl.
*B64C 31/036* (2006.01)
*B64C 17/02* (2006.01)

(52) U.S. Cl.
CPC ............ *B64C 17/02* (2013.01); *B64C 31/036* (2013.01)

(58) Field of Classification Search
CPC ....... B64C 17/02; B64C 17/08; B64C 31/036; B64C 2201/107
See application file for complete search history.

(56) References Cited

U.S. PATENT DOCUMENTS

| 2007/0023566 | A1  | 2/2007 | Howard |
| 2011/0036941 | A1  | 2/2011 | Cazals et al. |
| 2012/0104151 | A1* | 5/2012 | Mccann ................ B64C 31/036 244/13 |
| 2020/0070960 | A1* | 3/2020 | Parker ..................... B64D 31/06 |

FOREIGN PATENT DOCUMENTS

| EP | 3 228 537 B1 | 5/2019 |
| FR | 1124991 A1 | 10/1956 |

* cited by examiner

*Primary Examiner* — Richard G Davis
(74) *Attorney, Agent, or Firm* — Kelly & Kelley, LLP

(57) ABSTRACT

An aerial vehicle (10) has an aerial platform (12) that supports lift elements (11), an engine (14) and a fuel supply (15) and that has a coupling mechanism (16) adapted for coupling to a removable load (17). The lift elements include a soft or flexible wing (11) flexibly coupled to the aerial platform at points of suspension on opposite sides of the aerial platform whose location (A, B) relative to a longitudinal axis of the platform is such that the aerial platform and the attached load has a center of gravity (C.G.) which maintains balance of the aerial platform. An adjustment system (18) is coupled to the points of suspension and is operative for moving the points of suspension relative to the longitudinal axis of the platform when cargo is unloaded from the flying platform to preserve balance.

14 Claims, 1 Drawing Sheet

SYSTEM FOR AUTOMATIC ADJUSTMENT OF THE C.G (CENTER OF GRAVITY) POINT IN A POWERED PARACHUTE AND FLEXIBLE WING AERIAL VEHICLE

FIELD OF THE INVENTION

This invention relates to "Powered parachute", often abbreviated as PPC, defined in Wikipedia™ as a motorised parachute or paraplane, is a type of aircraft that consists of a parachute with a motor and wheels.

This invention is related also to the universal flying terrain vehicle disclosed in WO/2018/122842, in the name of the present applicant.

BACKGROUND OF THE INVENTION

The powered parachute is an aircraft that includes a parachute (soft wing) to create the lift, and a cart that hangs under the wing. The cart includes landing gear, passenger and pilot seats, an engine and propeller, fuel tank, control knobs and flying instruments. The cart hangs under the wing, in two hanging points, with a "Wing flexible attachment". The attachment is above the cart C.G (center of gravity) point, usually in the center of the passenger seat. This is because the mass is not important, but in order to maintain stability and equilibrium, the C.G point must be preserved when passengers embark and disembark, otherwise the very act of embarkation and disembarkation will induce a turning moment about the center of gravity that cause the aircraft to tilt.

As disclosed in https://www.flight-mechanic.com/powered-parachutes/ the point at which the inflated wing attaches to the structure of the aircraft may be adjustable to compensate for pilots and passengers of varying weights. With a very heavy pilot, the wing attach point would be moved forward to prevent the aircraft from being too nose heavy. The adjustment is made manually before takeoff.

US 20070018051 discloses a parachute steering system, of the type utilized to carry out the dropping of loads, to land them on a predetermined target. The parachute steering system comprises upper and lower platforms articulatingly joined to each other. The upper platform has a device for fastening a parachute, and the lower platform has a device for anchoring the load. An actuator system interconnects the platforms and allows parallelism, inclination and relative positioning in general between the platforms to be regulated, displacing a center of gravity of a combination of the load and the parachute.

Although in such an arrangement the center of gravity will obviously move axially along the platform when a payload is dropped, the platform is maintained level upon releasing a load by adjusting the inclination of the two platforms.

U.S. Pat. No. 9,944,389 discloses an air module attachable to a ground module. The air module is equipped with a center of gravity effector to change the relative locations and hence the center of gravity of the air and ground modules when the modules are attached and to compensate for a change in payload such as soldiers and equipment embarking and disembarking from the ground module while the aircraft is in hover. Attitude sensors detect the attitude of the aircraft and supply the attitude information to a microprocessor, which compares the detected attitude to the commanded attitude of the aircraft. If there is a discrepancy, the microprocessor activates actuators and adjusts the relative position of the center of lift and the center of gravity to restore the commanded attitude.

Center of gravity adjustment may involve moving the center of gravity with respect to the center of lift by moving the ground module with respect to the air module so that the center of gravity of the aircraft, its load and it occupants is directly below the center of lift of the rotor(s) and wing when the aircraft is flying at the commanded attitude. Alternatively, active CG control may take the form of moving the center of lift of the air module with respect to the ground module.

In both of these prior art systems, the suspension points of the parachute remain fixed relative to the payload platform.

US 2007023566 discloses a vehicle that is alternatively adaptable for controlled, powered operation on the ground as an all-terrain vehicle (ATV), or in the air as a powered parachute, or for controlled, powered operation on both the ground and in the air as a flying ATV. Outriggers are attached to the top of a main frame of the vehicle for attachment thereto of brackets that join the chute lines to the main frame, when the vehicle is configured for flight. The brackets are configured so that they can be moved fore and aft along the outriggers to obtain proper alignment of the center of gravity of the chassis and the chute.

FR 1 124 991 discloses an aerodyne comprising a fuselage and a wing, and means allowing the wing to be moved on the fuselage in the direction of flight aerodyne between two predetermined limits such that the center of the aerodynamic thrusts of the aerodyne can always be brought close to its center of gravity, regardless of the Mach number reached by the aerodyne.

US 2011036941 discloses an aircraft having a fuselage, a wing integral with the fuselage in a middle section in a longitudinal direction of the fuselage, and a tail assembly integral with the fuselage. The wing is mounted to be movable longitudinally in translation relative to the fuselage between extreme forward rearward positions so that the center of gravity of the aircraft can be displaced longitudinally to be positioned precisely at any time relative to the point of application of the resultant of the aerodynamic lift forces.

EP 3 228 537 discloses an aerial vehicle having a fuselage, a wing, and a wing shift device coupled to the fuselage in a manner that permits the wing to be shifted in a forward or aft direction along the fuselage based on a center of gravity of the aerial vehicle.

SUMMARY OF THE INVENTION

It is therefore an object of the present invention, to provide an automatic adjustment system of the C.G point, in a powered parachute, while cargo is unloaded from the flying platform.

This object is realized in accordance with an aerial platform having an adjustment mechanism according to the main claim. The aerial platform is configured to support a payload that may be a road vehicle, which when attached to the platform forms a flying vehicle.

In the present invention, such a vehicle may be supported from the platform using any suitable release mechanism and the aerial platform may be customized for use with a specific road vehicle. Alternatively, the aerial platform can be configured for attachment to different road vehicles so as to form a "Universal flying terrain vehicle" as disclosed in WO/2018/122842.

In either case, the terrain vehicle will not necessarily be suspended at the center of gravity of the flying platform, but in another point to create balance.

If in this configuration, the vehicle disconnects from the flying platform while running on the runway and lift is still applied to the wing, the C.G point of the flying platform will change, and if it is not adjusted immediately, the aircraft will get out of control in takeoff and will soon crash after leaving the ground.

The adjustment mechanism moves the CG point by moving the points of suspension of the parachute relative to the longitudinal axis of the platform.

BRIEF DESCRIPTION OF THE DRAWINGS

In order to understand the invention and to see how it may be carried out in practice, embodiments will now be described, by way of non-limiting example only, with reference to the accompanying drawings, in which.

DESCRIPTION OF THE INVENTION

Figure 1:
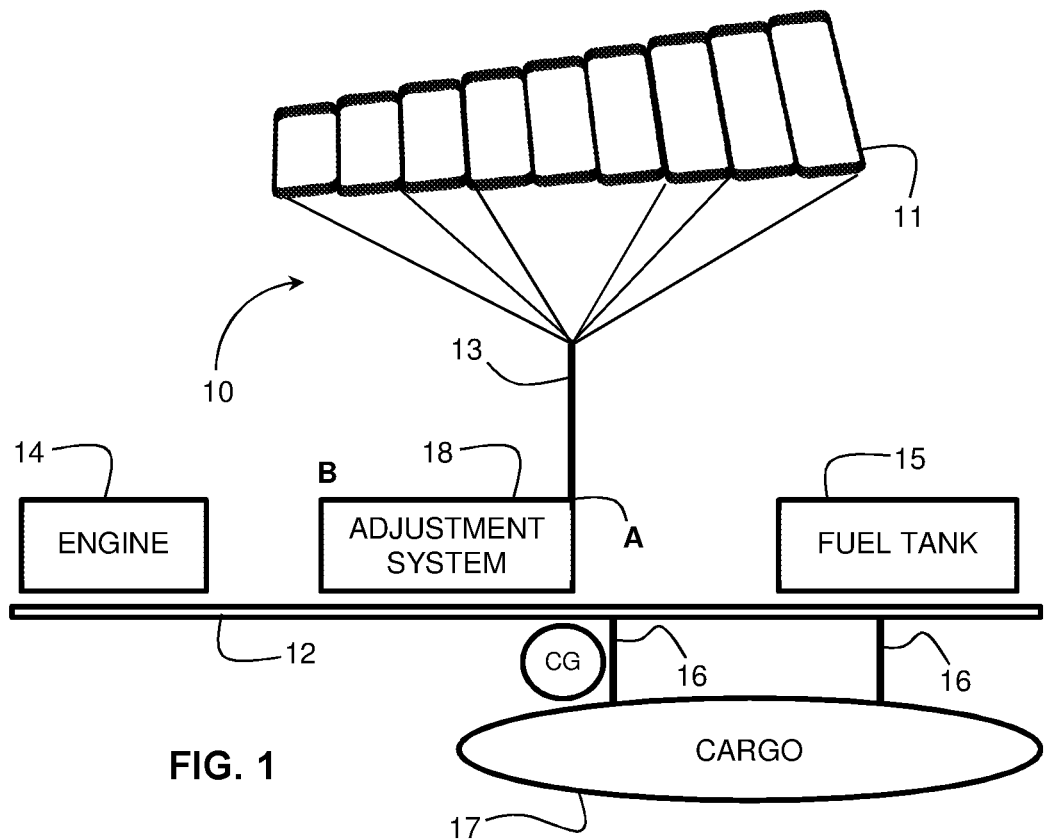
FIG. 1 shows schematically the powered parachute and the cargo (representing the flying vehicle) that is attached to the flight platform.

FIG. 1 shows schematically a powered parachute constituting an aerial vehicle 10 having a lift element in the form of a parachute 11 or other so-called "soft wing" or any other kind of flexible wing from which an aerial platform 12 is suspended by a tether 13 to suspension points located at a point A. The aerial platform 12 supports an engine 14, thrusters and landing gear (not shown) and a fuel supply 15 and has a coupling mechanism 16 adapted for releasably coupling to a removable cargo 17. Optionally, the cargo 17 may be a road vehicle and the aerial platform may be as described in WO/2018/122842. As is known per se, the tether is anchored to suspension points on opposite sides of the platform by a flexible joint, such as a ring coupling that allows the platform to remain level regardless of the angle of attack of the parachute. The location of the suspension points "A" relative to a longitudinal axis of the platform is such that the aerial platform and the attached load together has a center of gravity C.G. which maintains balance of the aerial platform. An automatic adjustment system 18 is coupled to the points of suspension and is operative for moving the points of suspension relative to the longitudinal axis of the platform while cargo is unloaded from the flying platform to preserve balance.

Figure 2:
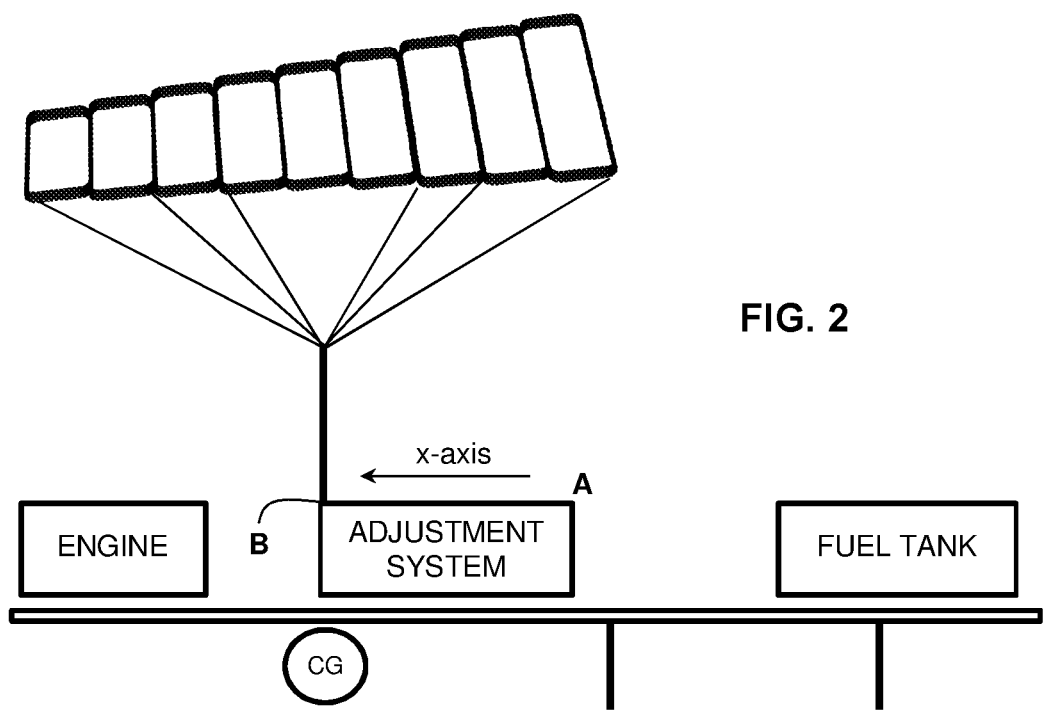
FIG. 2 shows the powered parachute with the cargo unloaded.

FIG. 2 shows the powered parachute, after the cargo is unloaded. This creates a new C.G point, and the automatic adjustment system 18 moves the flexible joint attachment backward, in vertical alignment with the new C.G point from point A (cargo mode) to point B (non-cargo mode).

If the engine has a mass of 100 kg and the cargo has a mass of 500 kg, then clearly the distance from the engine to the center of gravity will be close to five times the distance from the cargo to the center of gravity. If the cargo becomes detached, then the weight of the engine is going to exert an uncompensated moment about the center of gravity that will tilt the parachute out of control unless corrected for immediately. The automatic adjustment system corrects for any imbalance by shifting the flying platform axially toward the engine i.e. along the x-axis as shown in the figures relative to the parachute. Since the engine is attached to the flying platform, this shifts the center of gravity toward the engine so that the net moment applied by the engine is reduced owing to its being now located closer to the center of gravity.

The system is located under the wing flexible attachment on the flying platform. In some embodiments, the system automatic adjustment system 18 may include a frame, springs, pistons, rails and bearings in order to move the flexible wing attachment, which suspends the cart under the wing, on the X axis in order to change the point of suspension to the new C.G (center of gravity) point. For example, the system may be activated before take-off using a hydraulic piston that compresses a high-stiffness compression spring that is articulated to the flexible joints to which the suspension points are attached and is automatically released when the cargo is discharged from the coupling mechanism 16 and as a result almost instantaneously moves the flexible joints from point A to point B.

The automatic system 18 is pre-programmed to move from point A (cargo mode) to point B (non-cargo mode). In one embodiment, this programmed transition is made in advance, regarding the respective equilibrium point with or without cargo. Thus, based on the known mass of the removable cargo and the fixed elements carried by the aerial platform, respective equilibrium points are computed with the cargo loaded and unloaded. The adjustment mechanism is then configured to move the flexible joints to these points according to whether the cargo is loaded or released.

A second option is an automatic real-time calculation of the new C.G point by the cargo control computer, on the flight platform. The transition to the new center of gravity will be determined in real time by the cargo control computer on the flight platform, using sensors to find the new equilibrium point. This approach may be further configured for trimming during flight, in order to compensate for lack of balance caused by fuel consumption or for other reasons.

Although the invention has been described with particular reference to a powered parachute, it is to be understood that the invention is equally applicable to other so-called soft wing aerial vehicles. These may also include semi-rigid structures formed of textile, such as nylon, having reinforcement struts.

The invention claimed is:

1. An aerial vehicle comprising an aerial platform that supports lift elements, an engine and a fuel supply and has a coupling mechanism adapted for coupling to a removable load, wherein:
   the lift elements include a parachute flexibly coupled by a tether to the aerial platform at points of suspension on opposite sides of the aerial platform whose location (A, B) relative to a longitudinal axis of the platform is such that the aerial platform and the attached load has a center of gravity (C.G.) which maintains balance of the aerial platform, and
   an adjustment system is coupled to the points of suspension and is operative to correct for an imbalance caused by unloading the cargo from the aerial platform by performing a programmed transition whereby the points of suspension are moved relative to the longitudinal axis of the platform almost instantaneously from a first point A (cargo mode) to a second point B (non-cargo mode).

2. The aerial vehicle according to claim 1, wherein the adjustment system includes a frame, springs, and a piston configured to move the tether axially along the X axis, and thereby change the point of suspension in vertical alignment with a new C.G (center of gravity) point.

3. The aerial vehicle according to claim 2, wherein the piston is a hydraulic piston that is configured to compress a high-stiffness compression spring that is articulated to flexible joints to which the suspension points are attached and is automatically released when the cargo is discharged from the coupling mechanism and as a result almost instantaneously moves the flexible joints from point A to point B.

4. The aerial vehicle according to claim 1, wherein the programmed transition is predetermined based on a computation of a respective equilibrium point with or without cargo.

5. The aerial vehicle according to claim 4, comprising a cargo control computer responsive to signals provided by sensors on the aerial platform for computing the new C.G point automatically in real-time.

6. The aerial vehicle according to claim 1 being further configured for trimming during flight, in order to compensate for lack of balance due to fuel consumption or other reasons.

7. A flying vehicle comprising a road vehicle removably coupled to the aerial vehicle according to claim 1, wherein the adjustment system of the aerial vehicle is responsive to disconnection of the road vehicle from the aerial platform after landing and while still running on a runway with lift applied to the parachute, to move the C.G point of the aerial platform sufficiently fast to prevent the aerial vehicle getting out of control in takeoff.

8. An aerial vehicle comprising an aerial platform that supports lift elements, an engine and a fuel supply and has a coupling mechanism adapted for coupling to a removable load, wherein:
   the lift elements include a semi-rigid structure formed of textile having reinforcement struts flexibly coupled by a tether to the aerial platform at points of suspension on opposite sides of the aerial platform whose location (A, B) relative to a longitudinal axis of the platform is such that the aerial platform and the attached load has a center of gravity (C.G.) which maintains balance of the aerial platform, and
   an adjustment system is coupled to the points of suspension and is operative to correct for an imbalance caused by unloading the cargo from the aerial platform by performing a programmed transition whereby the points of suspension are moved relative to the longitudinal axis of the platform almost instantaneously from a first point A (cargo mode) to a second point B (non-cargo mode).

9. The aerial vehicle according to claim 8, wherein the adjustment system includes a frame, springs, and a piston configured to move the tether axially along the X axis, and thereby change the point of suspension in vertical alignment with a new C.G (center of gravity) point.

10. The aerial vehicle according to claim 8, wherein the piston is a hydraulic piston that is configured to compress a high-stiffness compression spring that is articulated to flexible joints to which the suspension points are attached and is automatically released when the cargo is discharged from the coupling mechanism and as a result almost instantaneously moves the flexible joints from point A to point B.

11. The aerial vehicle according to claim 10, comprising a cargo control computer responsive to signals provided by sensors on the aerial platform for computing the new C.G point automatically in real-time.

12. The aerial vehicle according to claim 8, wherein the programmed transition is predetermined based on a computation of a respective equilibrium point with or without cargo.

13. The aerial vehicle according to claim 8 being further configured for trimming during flight, in order to compensate for lack of balance due to fuel consumption or other reasons.

14. A flying vehicle comprising a road vehicle removably coupled to the aerial vehicle according to claim 8, wherein the adjustment system of the aerial vehicle is responsive to disconnection of the road vehicle from the aerial platform after landing and while still running on a runway with lift applied to the wing, to move the C.G point of the aerial platform sufficiently fast to prevent the aerial vehicle getting out of control in takeoff.

\* \* \* \* \*